United States Patent
Lin

(10) Patent No.: US 12,401,382 B2
(45) Date of Patent: Aug. 26, 2025

(54) CHIP, SYSTEM OF NOISE ANALYSIS AND METHOD OF NOISE ANALYSIS

(71) Applicant: Realtek Semiconductor Corporation, Hsinchu (TW)

(72) Inventor: Chung Chang Lin, Hsinchu (TW)

(73) Assignee: Realtek Semiconductor Corporation, Hsinchu (TW)

( * ) Notice: Subject to any disclaimer, the term of this patent is extended or adjusted under 35 U.S.C. 154(b) by 516 days.

(21) Appl. No.: 18/046,937

(22) Filed: Oct. 16, 2022

(65) Prior Publication Data
US 2023/0327692 A1 Oct. 12, 2023

(30) Foreign Application Priority Data
Apr. 6, 2022 (TW) .................................. 111113082

(51) Int. Cl.
*H04B 1/10* (2006.01)
*H04B 1/40* (2015.01)

(52) U.S. Cl.
CPC ............. *H04B 1/1027* (2013.01); *H04B 1/40* (2013.01)

(58) Field of Classification Search
CPC ... H04B 3/02; H04B 3/32; H04B 1/30; H04B 1/006; H04B 5/22; H04B 1/18; H04B 1/0475; H04B 3/487; H04B 5/79; H04B 17/318; H04B 1/16; H04B 10/564; H04B 3/30; H04B 5/263; H04B 1/40; H04B 1/525; H04B 10/40; H04B 2203/5483; H04B 10/50; H04B 10/504
USPC ......................................................... 455/73
See application file for complete search history.

(56) References Cited

U.S. PATENT DOCUMENTS

| | | | | |
|---|---|---|---|---|
| 2001/0030785 | A1* | 10/2001 | Pangrac | H04N 21/23608 375/E7.022 |
| 2009/0262709 | A1* | 10/2009 | Mason | H04L 1/20 370/336 |
| 2011/0032849 | A1* | 2/2011 | Yeung | H04B 7/0617 370/328 |
| 2011/0054282 | A1* | 3/2011 | Nekoomaram | G01K 13/00 600/347 |

FOREIGN PATENT DOCUMENTS

TW 201108633 A 3/2011
TW M621083 U 12/2021

* cited by examiner

*Primary Examiner* — Ajibola A Akinyemi
(74) *Attorney, Agent, or Firm* — CKC & Partners Co., LLC

(57) ABSTRACT

A chip comprises a plurality of signal receiving circuits, a transceiver circuit and a memory circuit. The plurality of signal receiving circuits are set at different locations on the chip. The transceiver circuit includes a dynamic switch circuit and a baseband processor. The dynamic switch circuit is configured to output a to-be-analyzed signal from the one of the plurality of signal receiving circuits. The baseband processor is configured to obtain a frequency spectrum and magnitude of the to-be-analyzed signal, and obtain a data packet of an input radio-frequency signal received by an external antenna. The memory circuit is configured to store the frequency spectrum and magnitude of the to-be-analyzed signal, and transmit the frequency spectrum and magnitude to an external computing device, so as to determine an interference path, an interference source or a combination thereof of an interference signal of the transceiver circuit through the external computing device.

20 Claims, 5 Drawing Sheets

CHIP, SYSTEM OF NOISE ANALYSIS AND METHOD OF NOISE ANALYSIS

RELATED APPLICATIONS

This application claims priority to Taiwan Application Serial Number 111113082, filed on Apr. 6, 2022, which is herein incorporated by reference in its entirety.

BACKGROUND

Field of Invention

The disclosure is related to a chip, and a system and a method for circuit verifications. More particularly, the disclosure is related to a chip, a system of noise analysis and a method of noise analysis able to obtain internal signal characteristics of the chip.

Description of Related Art

As the integration and complexity of system on a chip (SoCs) continue to increase, the types and operating frequencies of semiconductor intellectual property core inside the chips also increase, which makes different types of circuit interfere with each other more and more seriously. Since high-speed wireless communication chips have higher requirements on the signal-to-noise ratio, it is particularly important to eliminate interference to radio-frequency circuits. In the pre-silicon verification stage, developers can use simulation software to evaluate possible interference sources and interference paths. However, simulation software and simulation data may have limitations and cannot fully and accurately reflect the actual situation. On the other hand, in the post-silicon verification stage, developers can evaluate possible interference sources and interference paths by measuring circuits, but the circuit components and packaging materials on the chip may block the possible propagation paths of interference signals (such as the substrate of the chip), so that the chip cannot receive a comprehensive and complete measurement.

SUMMARY

The disclosure provides a chip comprising a plurality of signal receiving circuits, a transceiver circuit and a memory circuit. The plurality of signal receiving circuits are set at different locations on the chip. The transceiver circuit includes a dynamic switch circuit and a baseband processor. The dynamic switch circuit is configured to output a to-be-analyzed signal from the one of the plurality of signal receiving circuits. The baseband processor is configured to obtain a frequency spectrum and magnitude of the to-be-analyzed signal, and configured to obtain a data packet of an input radio-frequency signal received by an external antenna. The memory circuit is configured to store the frequency spectrum and magnitude of the to-be-analyzed signal of each of the plurality of signal receiving circuits and transmit the frequency spectrum and magnitude of the to-be-analyzed signal to an external computing device, so as to determine an interference path, an interference source or a combination thereof of an interference signal of the transceiver circuit through the external computing device.

This disclosure provides a method of noise analysis, which is suitable for a system of noise analysis. The system of noise analysis includes a chip and an external computing device, and the chip includes a plurality of signal receiving circuits, a transceiver circuit and a memory circuit. The aforementioned method comprises the following steps: controlling the dynamic switch circuit of the transceiver circuit to output a to-be-analyzed from the one of the plurality of signal receiving circuits; controlling a baseband processor of the transceiver circuit to obtain a frequency spectrum and magnitude of the to-be-analyzed signal of each of the plurality of signal receiving circuits, wherein the baseband processor is configured to obtain a data packet of an input radio-frequency signal received by an external antenna; storing the frequency spectrum and magnitude of the to-be-analyzed signal of each of the plurality of signal receiving circuits in the memory circuit; and generating a display signal correspondingly according to the frequency spectrum and magnitude of the to-be-analyzed signal of each of the plurality of signal receiving circuits through the external computing device, wherein the display signal is configured to control a display device to generate a display image, so as to determine an interference path, an interference source or a combination thereof of an interference signal of the transceiver circuit.

This disclosure provides a system of noise analysis, which includes a chip and an external computing device. The chip includes a plurality of signal receiving circuits, a transceiver circuit and a memory circuit. The plurality of signal receiving circuits are set at different locations on the chip. The transceiver circuit includes a dynamic switch circuit and a baseband processor. The dynamic switch circuit is configured to output a to-be-analyzed signal from the one of the plurality of signal receiving circuits. The baseband processor is configured to obtain a frequency spectrum and magnitude of the to-be-analyzed signal, and configured to obtain a data packet of an input radio-frequency signal received by an external antenna. The memory circuit is configured to store the frequency spectrum and magnitude of the to-be-analyzed signal of each of the plurality of signal receiving circuits. The external computing device is configured to generate a display signal correspondingly according to the frequency spectrum and magnitude of the to-be-analyzed signal of each of the plurality of signal receiving circuits, and the display signal is used to control the display device to display, so as to determine an interference path, an interference source or a combination thereof of an interference signal of the transceiver circuit.

One of the advantages of the above-mentioned chip, system and method of noise analysis is that the real signal characteristics of each designated part of the chip can be obtained and analyzed, thereby helping to accurately determine the location of the interference source and the interference path.

It is to be understood that both the foregoing general description and the following detailed description are by examples, and are intended to provide further explanation of the disclosure as claimed.

DETAILED DESCRIPTION

Figure 1:
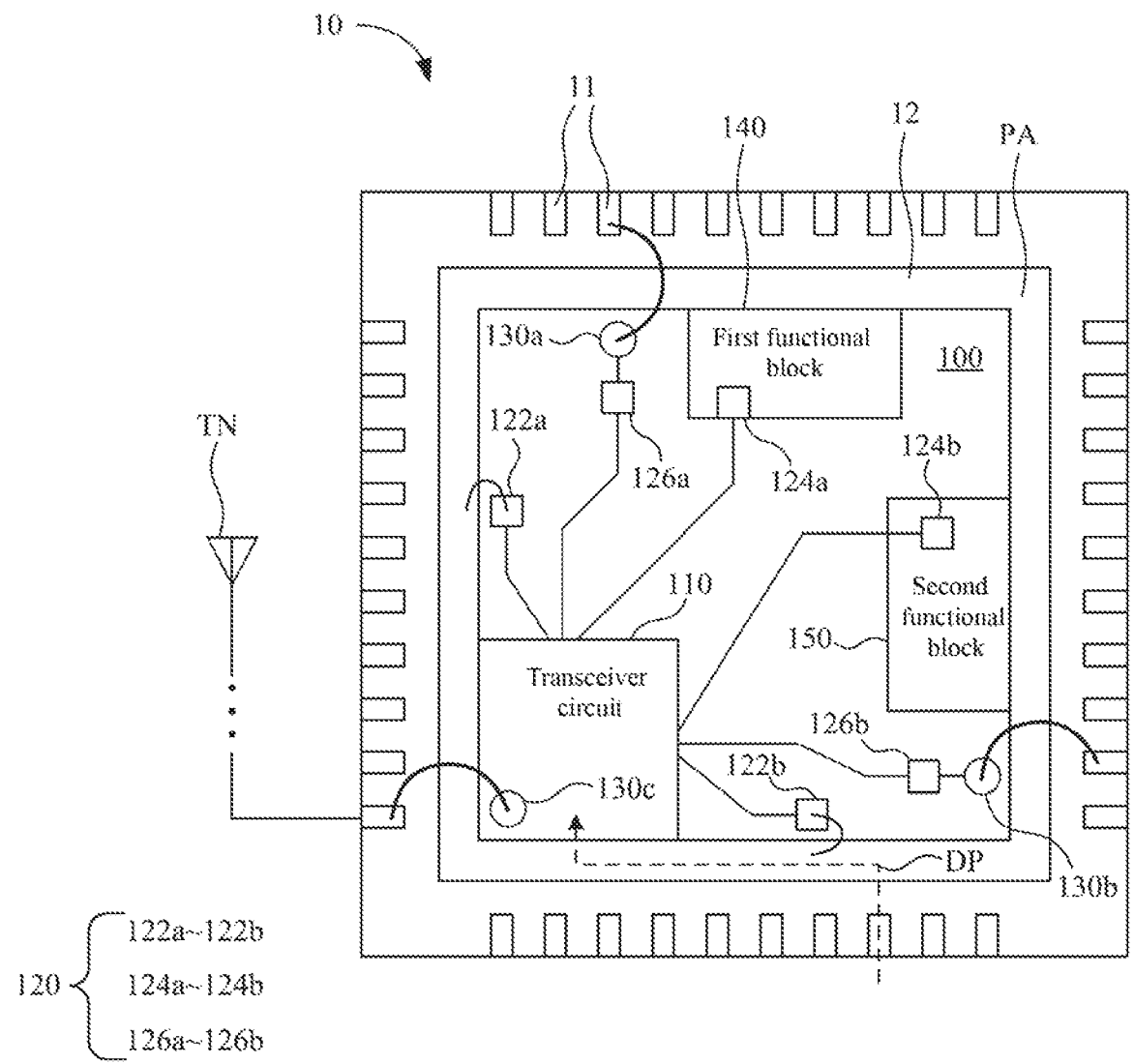
FIG. 1 is a top view schematic diagram of an integrated circuit package in accordance with an embodiment of the present disclosure.

Reference will now be made in detail to the present embodiments of the disclosure, examples of which are illustrated in the accompanying drawings. Wherever possible, the same reference numbers are used in the drawings and the description to refer to the same or like parts.

FIG. 1 is a top view schematic diagram of an integrated circuit package 10 in accordance with an embodiment of the present disclosure. For the convenience of explaining the internal structure of the integrated circuit package 10, the top structure of the integrated circuit package 10 is omitted in FIG. 1. The integrated circuit package 10 includes a chip 100, a plurality of leads 11 and an exposed pad 12. In some embodiments, the integrated circuit package 10 is a quad flat no-lead package, but the present disclosure is not limited thereto. The plurality of leads 11 and the exposed pad 12 can be soldered to a printed circuit board (not shown in FIG. 1), and are used to transmit voltage, current or various control signals between the chip 100 and the printed circuit board. The chip 100 is electrically connected to a first surface PA of the exposed pad 12, and in one embodiment, the chip 100 can be grounded through the exposed pad 12 or receive power input from the printed circuit board. The chip 100 includes a transceiver circuit 110, a signal receiving system 120, a plurality of input-output pins 130a-130c, a first functional block 140, a second functional block 150, and a memory circuit (not shown in FIG. 1). In some embodiments, the memory circuit may be integrated into the transceiver circuit 110.

The transceiver circuit 110 is coupled to the external antenna TN on the printed circuit board through the input-output pin 130c. The transceiver circuit 110 is used to receive an input radio-frequency signal RF_in (shown in FIG. 2) from the external antenna TN, and the transceiver circuit 110 may also be used to transmit an output radio-frequency signal RF_out (shown in FIG. 2) to the external antenna TN. The signal receiving system 120 is coupled to the transceiver circuit 110 for receiving voltage signals or current signals at different locations of the chip 100, such as operating voltages or control signals required for operation. The signal receiving system 120 is also used to transmit these signals to the transceiver circuit 110 to perform frequency spectrum analysis and signal magnitude analysis, and the transceiver circuit 110 may store the analysis results in the memory circuit. The signals received by the signal receiving system 120 may include interfering signals for the transceiver circuit 110. By analyzing the data in the memory circuit, the interference source and/or the interference path that interferes with the input radio-frequency signal RF_in or the output radio-frequency signal RF_out can be determined.

The signal receiving system 120 includes first signal receiving circuits 122a-122b, second signal receiving circuits 124a-124b and third signal receiving circuits 126a-126b set at different locations on the chip 100. The first signal receiving circuits 122a-122b are coupled to the first surface PA of the exposed pad 12 for transmitting signals from different locations on the exposed pad 12 to the transceiver circuit 110. The second signal receiving circuits 124a-124b are coupled to the functional blocks (such as the first functional block 140 and the second functional block 150) and/or the substrate (not shown in FIG. 1) of the chip 100 for transmitting signals from different functional blocks or different locations on the substrate to the transceiver circuit 110. The third signal receiving circuits 126a-126b are coupled to different input-output pins 130a-130b for transmitting signals on the input-output pins 130a-130b to the transceiver circuit 110. By analyzing the above-mentioned different types of signals and comparing the interference signal with the analysis result, the interference source and/or the interference path can be determined.

In some embodiments, the locations where the first signal receiving circuits 122a-122b electrically connect to the exposed pad 12 correspond to (or are close to) different sides of the first surface PA. For example, as shown in FIG. 1, the first signal receiving circuits 122a-122b are coupled to a location near the left side of the first surface PA and a location near the lower side of the first surface PA, respectively. Such arrangement helps to confirm the transmission path of the interference signal on the exposed pad 12. For example, when the frequency spectrum of the interference signal has been confirmed, and the data related to the first signal receiving circuits 122a-122b show that a signal of this specific frequency spectrum exists on the exposed pad 12, the signal magnitude of the first signal receiving circuits 122a-122b in the data can be further compared. When the signal magnitude of the first signal receiving circuit 122b is larger, it indicates that the interference signal may be transmitted from the printed circuit board to the transceiver circuit 110 through the lower edge of the exposed pad 12 along an interference path DP (marked with a dotted line) in FIG. 1.

In some embodiments, the second signal receiving circuits 124a-124b are respectively located in the first functional block 140 and the second functional block 150, and are electrically connected to the substrate. The first functional block 140 and the second functional block 150 may perform different operations or be located in different clock fields, thus corresponding to different frequencies of noise. For example, the first functional block 140 and the second functional block 150 may be analog-to-digital converters (ADCs), digital-to-analog converters (DACs), packet encoders, packet decoders, or low-dropout linear regulators, but the present disclosure is not limited thereto. When the frequency spectrum of the interference signal is confirmed, it can be determined whether the interference signal originates from the first functional block 140 and the second functional block 150 from the data related to the second signal receiving circuits 124a-124b.

Similarly, by coupling the third signal receiving circuits 126a-126b to different input-output pins 130b-130c, it can be determined whether the interference signal originates from the input-output pins 130b-130c.

In the above-mentioned embodiment, the first signal receiving circuits 122a-122b, the second signal receiving circuits 124a-124b and the third signal receiving circuits 126a-126b may be implemented by metal wires, but the present disclosure is not limited thereto.

In some embodiments, the first signal receiving circuits 122a-122b, the second signal receiving circuits 124a-124b, and the third signal receiving circuits 126a-126b may be implemented by antenna units (e.g., patch antennas). The signals on the exposed pad 12, the substrate and the input-output pins 130b-130c may be coupled to the antenna unit through air or other circuit elements, and then transmitted to the transceiver circuit 110. In this case, the locations of the first signal receiving circuits 122a-122b may be close to different sides of the first surface PA but not directly electrically connected to the exposed pad 12. The second signal receiving circuits 124a-124b can be respectively located in the first functional block 140 and the second functional block 150 and are not directly electrically connected to the substrate. The locations of the third signal receiving circuits 126a-126b may be close to but not directly electrically connected to the input-output pins 130b-130c.

In other embodiments, the first signal receiving circuits 122a-122b, the second signal receiving circuits 124a-124b and the third signal receiving circuits 126a-126b may be implemented by a combination of metal wires and antenna units.

Figure 2:
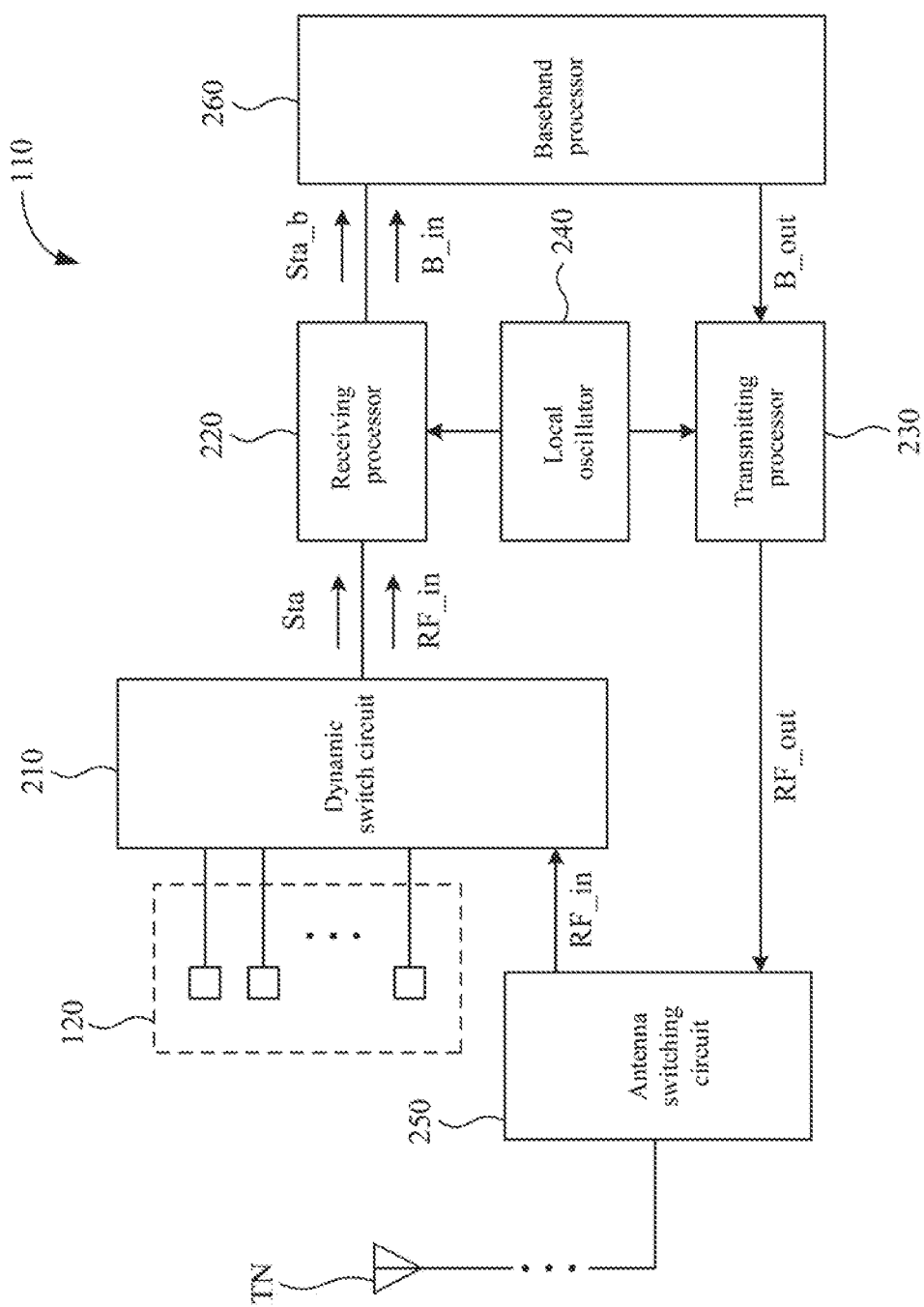
FIG. 2 is a simplified functional block diagram of a transceiver circuit in accordance with an embodiment of the present disclosure.

FIG. 2 is a simplified functional block diagram of a transceiver circuit 110 in accordance with an embodiment of the present disclosure. The transceiver circuit 110 includes a dynamic switch circuit 210, a receiving processor 220, a transmitting processor 230, a local oscillator 240, an antenna switching circuit 250 and a baseband processor 260. The antenna switching circuit 250 is coupled to the dynamic switch circuit 210 and the transmitting processor 230, and is used to switch the external antenna TN to the dynamic switch circuit 210 or the transmitting processor 230 depending on the receiving mode and the transmitting mode. In some embodiments, the antenna TN may be implemented as a plurality of antennas respectively coupled to the receiving processor 220 and the transmitting processor 230, and the antenna switching circuit 250 may be omitted. In other embodiments, the transceiver circuit 110 may include a plurality of sets of receiving processor 220 and transmitting processor 230, and these receiving processors 220 and transmitting processors 230 may cooperate with a plurality of antennas, so that the transceiver circuit 110 carries multiple-input-multiple-output (MIMO) function.

A plurality of input terminals of the dynamic switch circuit 210 are coupled to the antenna switching circuit 250 and the signal receiving system 120 (i.e., to the first signal receiving circuits 122a-122b, the second signal receiving circuits 124a-124b and the third signal receiving circuit 126a-126b). An output terminal of the dynamic switch circuit 210 is coupled to the receiving processor 220. The dynamic switch circuit 210 is used to selectively switch one of the signal receiving system 120 and the antenna switching circuit 250 to the receiving processor 220, wherein the baseband processor 260 can be used to control the switching operation of the dynamic switch circuit 210. In some embodiments, under normal operating conditions (e.g., the integrated circuit package 10 of FIG. 1 acts as a part of the communication system of a smartphone), the baseband processor 260 may control the dynamic switch circuit 210 to connect the antenna switching circuit 250 with the receiving processor 220, and disconnect the signal receiving system 120 from the receiving processor 220, that is, the input radio-frequency signal RF_in received by the external antenna TN can be transmitted to the receiving processor 220 through the antenna switching circuit 250 and the dynamic switch circuit 210.

In other embodiments, under circuit verifications (e.g., post-silicon verification for the integrated circuit package 10 of FIG. 1), the baseband processor 260 may control the dynamic switch circuit 210 to connect the signal receiving system 120 with the receiving processor 220, and disconnect the antenna switching circuit 250 from the receiving processor 220. The baseband processor 260 controls the dynamic switch circuit 210 to sequentially connect the first signal receiving circuits 122a-122b, the second signal receiving circuits 124a-124b and the third signal receiving circuits 126a-126b to the receiving processor 220 in a proper order. In other words, the dynamic switch circuit 210 sequentially outputs the plurality of signals respectively received by the plurality of signal receiving circuits, and transmits them to the receiving processor 220 as to-be-analyzed signals Sta.

The receiving processor 220 is coupled between the dynamic switch circuit 210 and the baseband processor 260. The transmitting processor 230 is coupled between the antenna switching circuit 250 and the baseband processor 260. By cooperating with the local oscillator 240, the receiving processor 220 is used to demodulate the input radio-frequency signal RF_in received by the external antenna TN into an input baseband signal B_in, and demodulate the to-be-analyzed signal Sta into a to-be-analyzed baseband signal. The receiving processor 220 may transmit the demodulated signals to the baseband processor 260. In addition, by cooperating with the local oscillator 240, the transmitting processor 230 is used to modulate an output baseband signal B_out generated by the baseband processor 260 into an output radio-frequency signal RF_out, and transmit the output radio-frequency signal RF_out to the external antenna TN through the antenna switching circuit 250.

In some embodiments, under normal operating conditions, the baseband processor 260 is used to obtain data packets from the input baseband signal B_in, that is, obtain the data packets transmitted by the input radio-frequency signal RF_in. In other embodiments, under circuit verifications, the baseband processor 260 is used to perform frequency spectrum analysis and signal magnitude analysis on a to-be-analyzed baseband signal Sta_b to obtain a frequency spectrum and magnitude of the to-be-analyzed signal Sta. The baseband processor 260 may store the frequency spectrum and magnitude of each to-be-analyzed signal Sta in the memory circuit, thus the memory circuit stores the frequency spectrum and magnitude of the signals received by each of the first signal receiving circuits 122a-122b, the second signal receiving circuits 124a-124b and the third signal receiving circuits 126a-126b.

Figure 3:
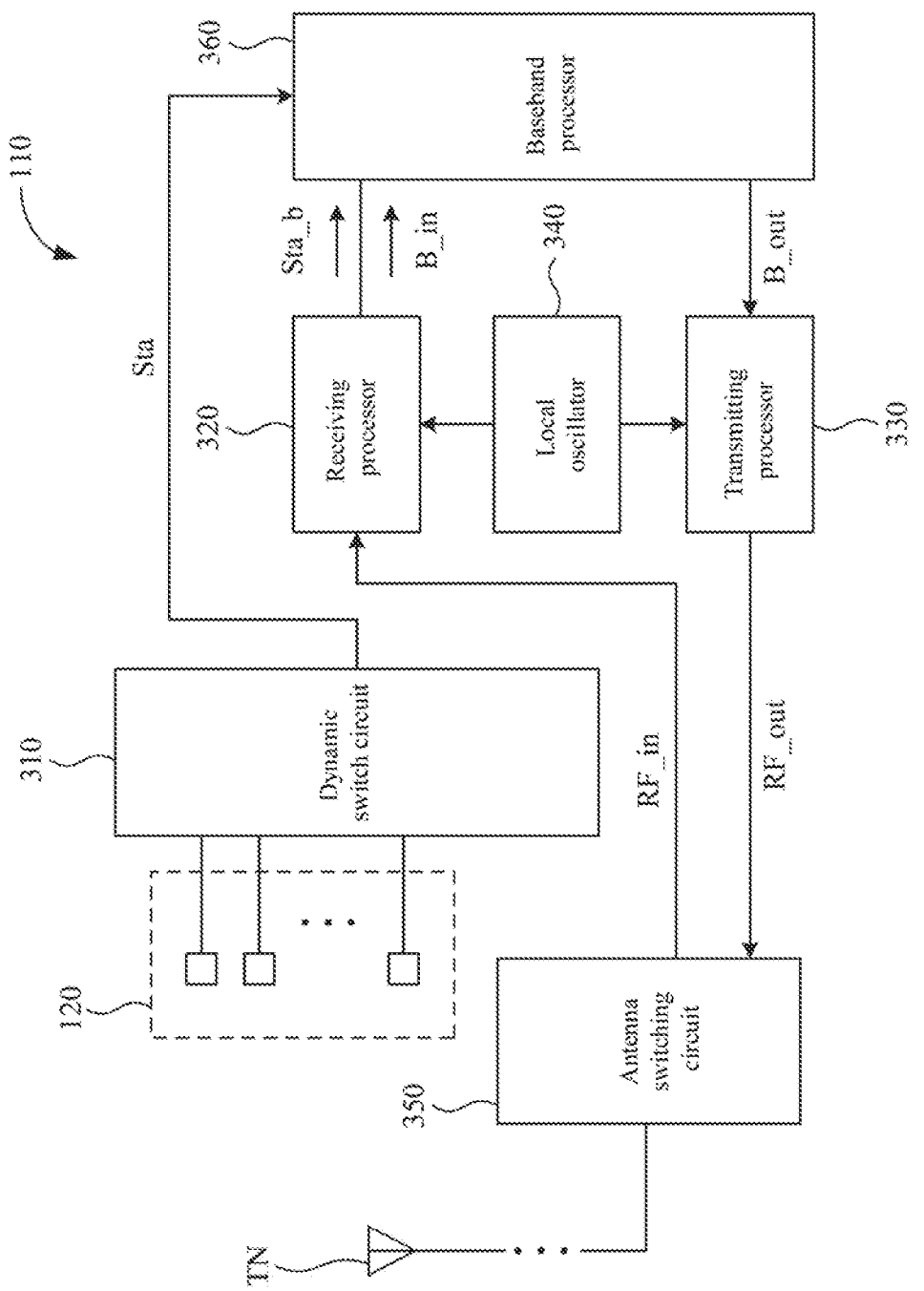
FIG. 3 is a simplified functional block diagram of a transceiver circuit in accordance with another embodiment of the present disclosure.

FIG. 3 is a simplified functional block diagram of a transceiver circuit 110 in accordance with an embodiment of the present disclosure. In present embodiment, the transceiver circuit 110 includes a dynamic switch circuit 310, a receiving processor 320, a transmitting processor 330, a local oscillator 340, an antenna switching circuit 350 and a baseband processor 360. The connection relationship, advantages, and operations of the transmitting processor 330 and the local oscillator 340 are respectively similar to the corresponding circuit blocks in FIG. 2, and are not repeated here for the sake of brevity.

The antenna switching circuit 350 is coupled to the receiving processor 320 and the transmitting processor 330. In some embodiments, under normal operating conditions, the antenna switching circuit 350 is used to switch the external antenna TN to the receiving processor 320 or the transmitting processor 330 depending on the receiving mode and transmitting mode.

The dynamic switch circuit 310 is coupled between the signal receiving system 120 (i.e., the first signal receiving circuits 122a-122b, the second signal receiving circuits 124a-124b and the third signal receiving circuit 126a-126b) and the baseband processor 360. In some embodiments, under circuit verifications, the dynamic switch circuit 310 is used to connect a plurality of signal receiving circuits in the signal receiving system 120 to the baseband processor 360 sequentially, so as to output a plurality of signals respectively received by the plurality of signal receiving circuits sequentially as to-be-analyzed signals Sta. The dynamic switch circuit 310 is further used to transmit the to-be-analyzed signals Sta to the baseband processor 360.

The baseband processor 360 is used to control the switching operation of the dynamic switch circuit 310. In some embodiments, under normal operating conditions, the baseband processor 360 is used to obtain data packets from the input baseband signal B_in, that is, obtain the data packets transmitted by the input radio-frequency signal RF_in. In other embodiments, under circuit verifications, the baseband processor 360 is used to perform frequency spectrum analysis and signal magnitude analysis on the to-be-analyzed signal Sta to obtain a frequency spectrum and magnitude of the to-be-analyzed signal Sta. In other words, in present embodiment, the to-be-analyzed signal Sta can be input to the baseband processor 360 for analysis without being demodulated.

Figure 4:
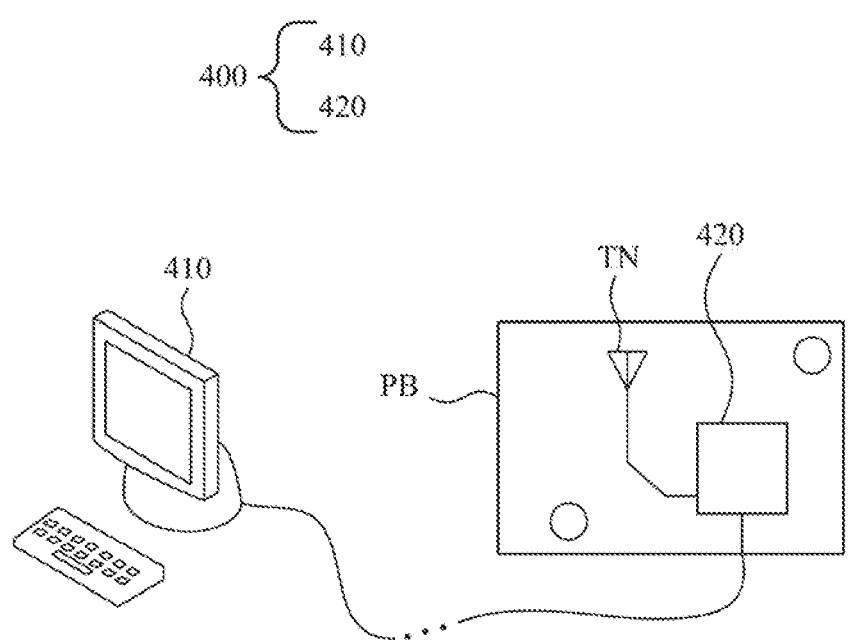
FIG. 4 is a schematic diagram of a system of noise analysis in accordance with an embodiment of the present disclosure.

FIG. 4 is a schematic diagram of a system 400 of noise analysis in accordance with an embodiment of the present disclosure. The system 400 of noise analysis includes an external computing device 410 and an integrated circuit package 420. The external computing device 410 is coupled to the integrated circuit package 420. The integrated circuit package 420 is located on the printed circuit board PB and used to perform wireless communication through the external antenna TN. In some embodiments, the external computing device 410 may be implemented by a personal computer, notebook computer, or other electronic device with computing capabilities. The integrated circuit package 420 can be implemented by the integrated circuit package 10 of FIG. 1. In other words, the integrated circuit package 420 may include the chip 100 and thus may include the transceiver circuit 110 in the embodiment of FIG. 2 or FIG. 3.

The external computing device 410 is used to control the transceiver circuit 110 to perform frequency spectrum analysis and signal magnitude analysis on the signal received by the signal receiving system 120, and is used to read the analysis result of the transceiver circuit 110 from the memory circuit. In some embodiments, the external computing device 410 is used to generate a display signal correspondingly according to the analysis result, and the display signal is used to control a display unit of the external computing device 410 or an additional display device to generate a corresponding image, such as an image including a spectrogram. Thereby, the developer of the chip 100 can determine the interference path and/or the location of the interference source of the interference signal interfering with the transceiver circuit 110 in the integrated circuit package 420 and the printed circuit board PB. In some embodiments, the external computing device 410 is used to automatically determine the interference path and/or the location of the interference source according to the analysis results, and generate corresponding display signals to control the display unit of the external computing device 410 or an additional display device to provide a display that includes the interference path and/or the location of the interference source.

Figure 5:
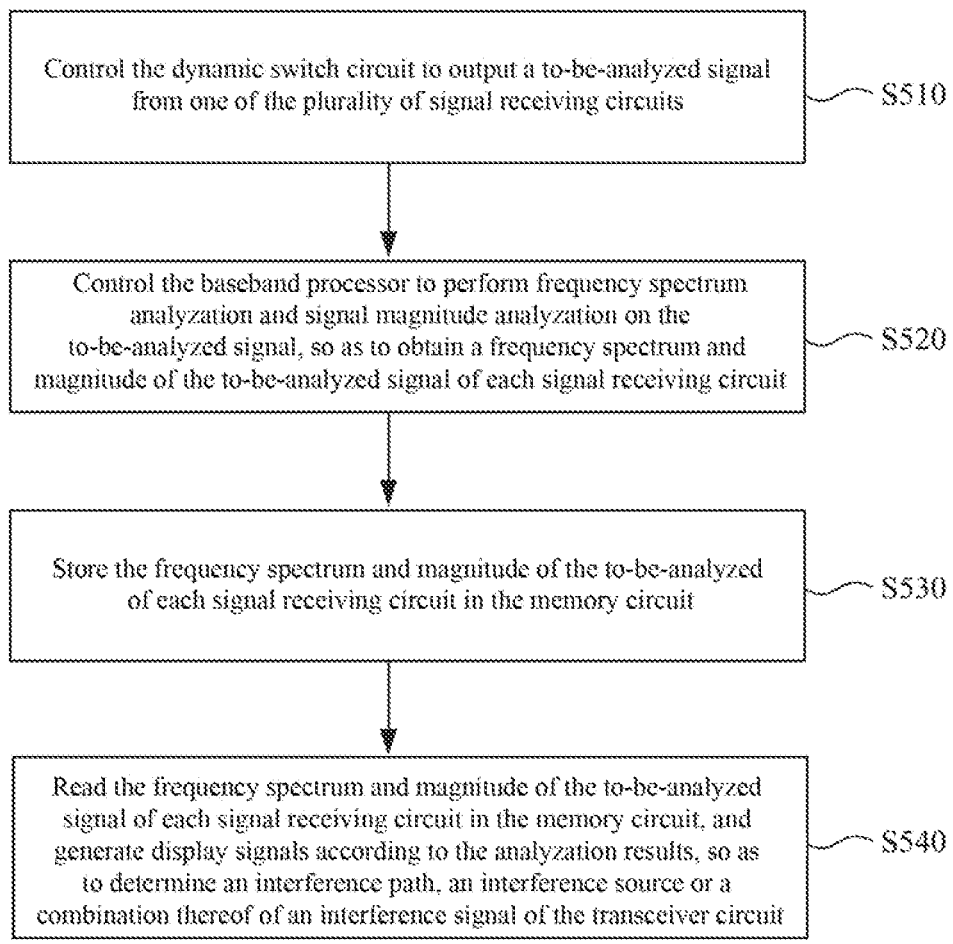
FIG. 5 is a flowchart of a method of noise analysis in accordance with an embodiment of the present disclosure.

In detail, the non-transitory computer-readable medium in the external computing device 410 stores one or more computer-readable instructions. When executed, these instructions make the external computing device 410 execute part or all of a method 500 of noise analysis in FIG. 5 to control the transceiver circuit 110 to perform the aforementioned frequency spectrum analysis and signal magnitude analysis. The method 500 of noise analysis will be described below with reference to FIGS. 1-5.

In step S510, the external computing device 410 controls the dynamic switch circuit 210 (or the dynamic switch circuit 310) to output a to-be-analyzed signal Sta from the one of the first signal receiving circuits 122*a*-122*b*, the second signal receiving circuits 124*a*-124*b*, and the third signal receiving circuits 126*a*-126*b*.

In step S520, the external computing device 410 controls the baseband processor 260 (or the baseband processor 360) to perform frequency spectrum analysis and signal magnitude analysis on the to-be-analyzed signal Sta, so as to obtain a frequency spectrum and magnitude of the to-be-analyzed signal Sta of each signal receiving circuit.

In step S530, the baseband processor 260 (or the baseband processor 360) stores the frequency spectrum and magnitude of the to-be-analyzed Sta of each signal receiving circuit in the memory circuit on the chip 100.

In step S540, the external computing device 410 reads the frequency spectrum and magnitude of the to-be-analyzed Sta of each signal receiving circuit in the memory circuit. In some embodiments, the external computing device 410 generates display signals according to the analysis results to control its own or an additional display device to generate corresponding display images, thereby enabling the developer of the chip 100 to determine the interference path and/or the location of the interference source. In some embodiments, the external computing device 410 automatically determines the interference path and/or the location of the interference source according to the analysis results, and generate corresponding display signals to control its own or an additional display device to provide a display that includes the interference path and/or the location of the interference source.

To sum up, the chip 100, the system 400 of noise analysis and the method 500 of noise analysis in the present disclosure can obtain and analyze the real signal characteristics of each designated part on the chip 100, thereby helping to accurately determine the location of the interference source and the interference path. In other words, the various embodiments in the present disclosure overcome the problems commonly faced in the conventional circuit verification process, such as insufficient correctness and integrity of the simulation data, and the complex structure of the chip makes it difficult to measure comprehensively, and so on.

In addition, in various embodiments of the present disclosure, since the baseband processor 260 (or the baseband processor 360) responsible for wireless communication can be changed to perform frequency spectrum analysis and signal magnitude analysis during circuit verification, it does not need to place additional logic circuits on the chip 100 for circuit verification, thus helping to reduce overall circuit area Certain terms are used in the description and claim to refer to particular elements. However, it should be understood by those skilled in the art that the same elements may be referred to by different terms. The description and the claims do not take the difference in name as a way of distinguishing elements, but take the difference in function of the elements as a basis for distinguishing. The term "comprising" mentioned in the description and the claims is an open-ended term, so it should be interpreted as "including but not limited to". In addition, the term "coupled" herein includes any direct and indirect means of connection. Therefore, if it is described in the description and the claims that the first element is coupled to the second element, it means that the first element may be directly connected to the second element through electrical connection or signal connection such as wireless transmission or optical transmission, or through other elements or connections.

As used herein, the term "and/or" includes any combination of one or more of the mentioned elements. Unless otherwise specified in the description, any term in the singular also includes the meaning in the plural.

The above are preferred embodiments of the present disclosure, and various modifications and equivalent changes may be made to the structure of the present disclosure without departing from the scope or spirit of the present disclosure. In view of the foregoing, it is intended that the present disclosure cover modifications and variations of this invention provided they fall within the scope of the following claims.

What is claimed is:

1. A chip, comprising:
   a plurality of signal receiving circuits, set at different locations on the chip;
   a transceiver circuit, comprising:
      a dynamic switch circuit, configured to output a to-be-analyzed signal from the one of the plurality of signal receiving circuits; and
      a baseband processor, configured to obtain a frequency spectrum and magnitude of the to-be-analyzed signal, and configured to obtain a data packet of an input radio-frequency signal received by an external antenna; and
   a memory circuit, configured to store the frequency spectrum and magnitude of the to-be-analyzed signal of each of the plurality of signal receiving circuits, and transmit the frequency spectrum and magnitude of the to-be-analyzed signal of each of the plurality of signal receiving circuits to an external computing device, so as to determine an interference path, an interference source or a combination thereof of an interference signal of the transceiver circuit through the external computing device.

2. The chip of claim 1, wherein the dynamic switch circuit is configured to output the one of the to-be-analyzed signal and the input radio-frequency signal, and the transceiver circuit further comprises:
   a receiving processor, coupled between the dynamic switch circuit and the baseband processor, configured to demodulate the to-be-analyzed signal to generate a to-be-analyzed baseband signal, and configured to demodulate the input radio-frequency signal to generate a input baseband signal,
   wherein the baseband processor is configured to obtain the frequency spectrum and magnitude of the to-be-analyzed signal from the to-be-analyzed baseband signal, and obtain the data packet from the input baseband signal.

3. The chip of claim 1, wherein the plurality of signal receiving circuits include a plurality of first signal receiving circuits, wherein the chip is configured to be set on a first surface of an exposed pad, and the plurality of first signal receiving circuits are configured to transmit a plurality of first signals from different locations on the exposed pad to the transceiver circuit.

4. The chip of claim 1, further comprising a substrate, a plurality of functional blocks or a combination thereof, wherein the plurality of signal receiving circuits include a plurality of second signal receiving circuits, the plurality of second signal receiving circuits are configured to transmit a plurality of second signals to the transceiver circuit, wherein the plurality of second signals are sourced from different locations of the substrate, or sourced from different functional blocks among the plurality of functional blocks.

5. The chip of claim 1, further comprising:
   a plurality of input-output pins,
   wherein the plurality of signal receiving circuits include a plurality of third signal receiving circuits, the plurality of third signal receiving circuits are configured to transmit a plurality of third signals from the plurality of input-output pins to the transceiver circuit.

6. The chip of claim 1, wherein the dynamic switch circuit is configured to output a plurality of signals respectively received by the plurality of signal receiving circuits sequentially as the to-be-analyzed signal.

7. The chip of claim 1, wherein the plurality of signal receiving circuits include a metal wire, an antenna unit or a combination thereof.

8. A method of noise analysis, suitable for a system of noise analysis, wherein the system of noise analysis includes a chip and an external computing device, and the chip includes a plurality of signal receiving circuits, a transceiver circuit and a memory circuit, the method of noise analysis comprises:
   controlling a dynamic switch circuit of the transceiver circuit to output a to-be-analyzed signal from the one of the plurality of signal receiving circuits;
   controlling a baseband processor of the transceiver circuit to obtain a frequency spectrum and magnitude of the to-be-analyzed signal of each of the plurality of signal receiving circuits, wherein the baseband processor is configured to obtain a data packet of an input radio-frequency signal received by an external antenna;
   storing the frequency spectrum and magnitude of the to-be-analyzed signal of each of the plurality of signal receiving circuits to the memory circuit; and
   generating a display signal correspondingly according to the frequency spectrum and magnitude of the to-be-analyzed signal of each of the plurality of signal receiving circuits through the external computing device, wherein the display signal is configured to control a display device to generate a display image, so as to determine an interference path, an interference source or a combination thereof of an interference signal of the transceiver circuit.

9. The method of claim 8, wherein controlling the baseband processor of the transceiver circuit to obtain the frequency spectrum and magnitude of the to-be-analyzed signal of each of the plurality of signal receiving circuits comprises:
   demodulating the to-be-analyzed signal to generate a to-be-analyzed baseband signal through a receiving processor of the transceiver circuit; and
   obtaining the frequency spectrum and magnitude of the to-be-analyzed signal from the to-be-analyzed baseband signal through the baseband processor of the transceiver circuit.

10. The method of claim 8, wherein the plurality of signal receiving circuits include a plurality of first signal receiving circuits, wherein the chip is set on a first surface of an exposed pad, and the plurality of first signal receiving circuits are configured to transmit a plurality of first signals from different locations on the exposed pad to the transceiver circuit.

11. The method of claim 8, wherein the chip includes a substrate, a plurality of functional blocks or a combination thereof, wherein the plurality of signal receiving circuits include a plurality of second signal receiving circuits, the plurality of second signal receiving circuits are configured to transmit a plurality of second signals to the transceiver circuit, wherein the plurality of second signals are sourced from different locations of the substrate, or sourced from different functional blocks among the plurality of functional blocks.

12. The method of claim 8, wherein the chip includes a plurality of input-output pins, wherein the plurality of signal receiving circuits include a plurality of third signal receiving circuits, the plurality of third signal receiving circuits are configured to transmit a plurality of third signals from the plurality of input-output pins to the transceiver circuit.

13. The method of claim 8, wherein controlling the dynamic switch circuit of the transceiver circuit to output the to-be-analyzed signal from the one of the plurality of signal receiving circuits comprises:

receiving a plurality of signals through the plurality of signal receiving circuits, respectively; and controlling the dynamic switch circuit of the transceiver circuit to output the plurality of signals sequentially as the to-be-analyzed signal.

14. The method of claim 8, wherein the plurality of signal receiving circuits include a metal wire, an antenna unit or a combination thereof.

15. A system of noise analysis, comprising:

a chip, comprising:

a plurality of signal receiving circuits, set at different locations on the chip;

a transceiver circuit, comprising:

a dynamic switch circuit, configured to output a to-be-analyzed signal from the one of the plurality of signal receiving circuits; and a baseband processor, configured to obtain a frequency spectrum and magnitude of the to-be-analyzed signal, and configured to obtain a data packet of an input radio-frequency signal received by an external antenna; and a memory circuit, configured to store the frequency spectrum and magnitude of the to-be-analyzed signal of each of the plurality of signal receiving circuits; and an external computing device, configured to generate a display signal correspondingly according to the frequency spectrum and magnitude of the to-be-analyzed signal of each of the plurality of signal receiving circuits, wherein the display signal is configured to control a display device to generate a display image, so as to determine an interference path, an interference source or a combination thereof of an interference signal of the transceiver circuit.

16. The system of claim 15, wherein the dynamic switch circuit is configured to output one of the to-be-analyzed signal and the input radio-frequency signal, and the transceiver circuit further comprises:

a receiving processor, coupled between the dynamic switch circuit and the baseband processor, configured to demodulate the to-be-analyzed signal to generate a to-be-analyzed baseband signal, and configured to demodulate the input radio-frequency signal to generate a input baseband signal, wherein the baseband processor is configured to obtain the frequency spectrum and magnitude of the to-be-analyzed signal from the to-be-analyzed baseband signal, and obtain the data packet from the input baseband signal.

17. The system of claim 15, wherein the plurality of signal receiving circuits include a plurality of first signal receiving circuits, wherein the chip is configured to be set on a first surface of an exposed pad, and the plurality of first signal receiving circuits are configured to transmit a plurality of first signals from different locations on the exposed pad to the transceiver circuit.

18. The system of claim 15, wherein the chip further comprises a substrate, a plurality of functional blocks or a combination thereof, wherein the plurality of signal receiving circuits include a plurality of second signal receiving circuits, the plurality of second signal receiving circuits are configured to transmit a plurality of second signals to the transceiver circuit, wherein the plurality of second signals are sourced from different locations of the substrate, or sourced from different functional blocks among the plurality of functional blocks.

19. The system of claim 15, wherein the chip further comprising:

a plurality of input-output pins, wherein the plurality of signal receiving circuits include a plurality of third signal receiving circuits, the plurality of third signal receiving circuits are configured to transmit a plurality of third signals from the plurality of input-output pins to the transceiver circuit.

20. The system of claim 15, wherein the plurality of signal receiving circuits include a metal wire, an antenna unit or a combination thereof.

* * * * *